US012028762B2

(12) United States Patent
Cui et al.

(10) Patent No.: US 12,028,762 B2
(45) Date of Patent: Jul. 2, 2024

(54) SYSTEMS AND METHODS FOR EVENT TRIGGER REPORTING FOR L1 MEASUREMENT AND L1/L2 MOBILITY

(71) Applicant: APPLE INC., Cupertino, CA (US)

(72) Inventors: Jie Cui, Cupertino, CA (US); Dawei Zhang, Cupertino, CA (US); Haitong Sun, Cupertino, CA (US); Hong He, Cupertino, CA (US); Huaning Niu, Cupertino, CA (US); Manasa Raghavan, Cuerptino, CA (US); Qiming Li, Beijing (CN); Xiang Chen, Cupertino, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 429 days.

(21) Appl. No.: 17/593,473

(22) PCT Filed: Jan. 13, 2021

(86) PCT No.: PCT/CN2021/071560
§ 371 (c)(1),
(2) Date: Sep. 20, 2021

(87) PCT Pub. No.: WO2022/151077
PCT Pub. Date: Jul. 21, 2022

(65) Prior Publication Data
US 2023/0180077 A1 Jun. 8, 2023

(51) Int. Cl.
*H04W 36/14* (2009.01)
*H04W 36/00* (2009.01)
*H04W 36/08* (2009.01)

(52) U.S. Cl.
CPC ....... *H04W 36/0085* (2018.08); *H04W 36/08* (2013.01)

(58) Field of Classification Search
CPC ..... H04W 36/00; H04W 76/30; H04W 36/06; H04W 36/08; H04W 4/00; H04W 48/20; H04W 48/00; H04W 52/24; H04W 72/232; H04W 36/30; H04W 36/14
See application file for complete search history.

(56) References Cited

U.S. PATENT DOCUMENTS

2020/0367223 A1  11/2020  Cheng et al.
2023/0064231 A1*  3/2023  Haghighat ............ H04W 72/23

FOREIGN PATENT DOCUMENTS

WO        2019223634 A1    11/2019

OTHER PUBLICATIONS

Apple Inc., "On Beam Management Enhancement", R1-2008438, 3GPP TSG-RAN WG1 Meeting #103-e, e-Meeting, Agenda Item 8.1.1, Oct. 26-Nov. 13, 2020, 19 pages.

(Continued)

*Primary Examiner* — Tu X Nguyen
(74) *Attorney, Agent, or Firm* — Dorsey & Whitney LLP

(57) ABSTRACT

Embodiments of the present disclosure enable a user equipment (UE) to perform event trigger reporting for L1/L2 mobility, including event configuration, L1 filtering factor, and event triggered L1 reporting. Other embodiments may be described and claimed.

18 Claims, 6 Drawing Sheets

(56) References Cited

OTHER PUBLICATIONS

Ericsson, "Enhancements on Multi-beam Operation", Tdoc R1-2009288, 3GPP TSG-RAN WG1 Meeting #103-e, Online, Agenda Item 8.1.1, Oct. 26-Nov. 13, 2020, 20 pages.
Huawei, Hisilicon, "CR on CSI-RS based intra-frequency measurement requirements", R4-2017228, 3GPP TSG-RAN4 Meeting #97-e, Electronic Meeting, Change Request 38.133 CR 1277 rev 1 current version 16.5.0, Nov. 2-13, 2020, 8 pages.
PCT/CN2021/071560, International Search Report and Written Opinion, Oct. 12, 2021, 9 pages.
Spreadtrum Communications, "Enhancements on Multi-beam Operation", R1-2009141, 3GPP TSG RAN WG1 #103-e, e-Meeting, Agenda Item 8.1.1, Oct. 26-Nov. 13, 2020, 8 pages.

\* cited by examiner

SYSTEMS AND METHODS FOR EVENT TRIGGER REPORTING FOR L1 MEASUREMENT AND L1/L2 MOBILITY

TECHNICAL FIELD

This application relates generally to wireless communication systems, including performing and reporting Layer 1 (L1) measurements.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network, such as an Evolved Packet Core (EPC). Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A wireless network may configure a UE in a connected state to perform measurements and report the measurement results according to a measurement configuration. The measurement configuration may be provided by dedicated signaling. The measurement configuration may define, for example, measurement objects, reporting configurations, measurement gaps, and other parameters. For each measurement type (e.g., intra-frequency, inter-frequency, and inter-RAT), the measurement configuration may define one or more measurement object (MO). In NR, each MO may indicate frequency, timing, and subcarrier spacing of reference signals to be measured. When configured by the network, the UE may be able to perform Layer 1 reference signal received power (L1-RSRP) or Layer 1 signal-to-noise and interference ratio (L1-SINR) measurements of synchronization signal blocks (SSB), channel state information reference signal (CSI-RS), or both.

In certain systems, Layer 1 (L1 or Physical Layer) or Layer 2 (L2 or Media Access Control (MAC) Layer) signaling may trigger handover between transmission reception points (TRPS) within a cell or between cells. Thus, a UE may be configured to measure serving cell and neighbor cell L1-RSRP or L1-SINR and to provide L1 and L2 reporting for L1/L2 mobility. The network may change a transmission configuration indication (TCI) based on the reported L1-RSRP or L1-RSRP measurements to cause the UE to change from a current serving cell to a target neighbor cell.

Figure 1:
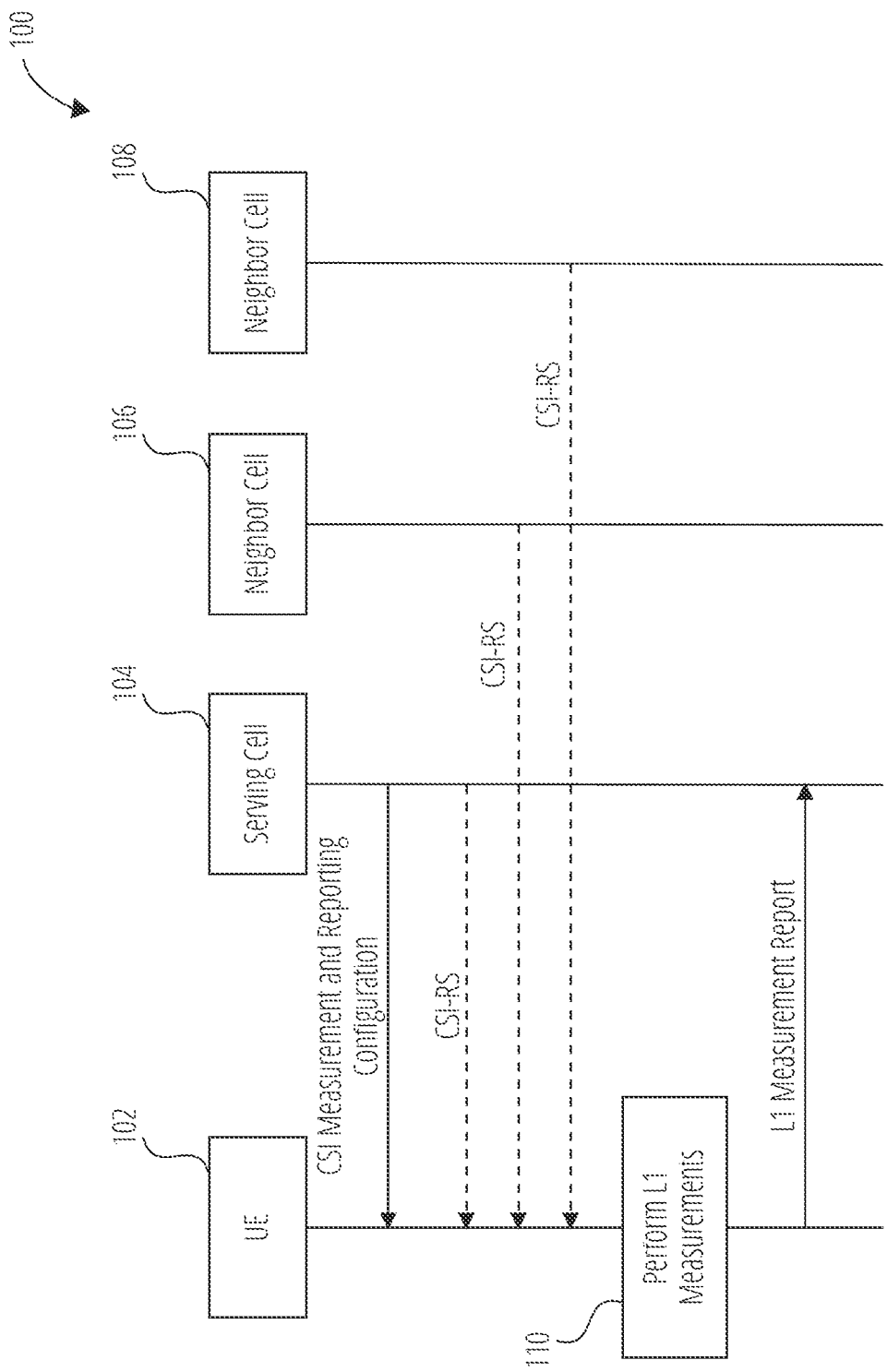
FIG. 1 is a diagram illustrating example L1 measurement and reporting that may be used with certain embodiments.

For example, FIG. 1 is a diagram illustrating example L1 measurement and reporting 100 that may be used with certain embodiments. In this example, a UE 102 receives a CSI measurement and reporting configuration from a serving cell 104. The CSI measurement and reporting configuration configures the UE 102 to perform L1 measurements 110 on CSI-RS signals received from the serving cell 104 and one or more neighbor cells (shown in this example as neighbor cell 106 and neighbor cell 108. If one or more reporting conditions indicated in the CSI measurement and reporting configuration is satisfied, the UE 102 generates and sends an L1 measurement report to the serving cell 104.

Generally, a UE may send L1 measurement reports (e.g., L1-RSRP, L1-SINR) for report configurations configured by the network. The UE may use periodic reporting, semi-persistent reporting, or aperiodic reporting. The UE may send periodic L1-RSRP measurement reports for an active bandwidth part (BWP). The UE transmits the periodic L1-RSRP reporting on a physical uplink control channel (PUCCH) over the air interface according to a predefined periodicity. For L1/L2 mobility, the network may configure periodical L1-RSRP and/or Layer 1 reference signal received quality (R1-RSRO) measurement report for both serving and neighbor cells from the UE. However, the periodic reporting may take too much signaling resources and occupy too much uplink (UL) channel resources, especially if the UE is monitoring many neighbor cells.

In semi-persistent reporting, the network activates reporting to the UE. For example, the UE may only send semi-persistent L1-RSRP or L1-SINR measurement reports on a physical uplink shared channel (PUSCH) when a downlink control information (DCI) request has been received from the network. As another example, the UE may only send semi-persistent L1-RSRP or L1-SINR measurement reports on PUCCH when an activation command has been received from the network. The UE transmits the semi-persistent L1-RSRP reporting on PUSCH or PUCCH over the air interface. For L1/L2 mobility, the network may activate a semi-persistent L1-RSRP/L1-RSRQ measurement report for both serving and neighbor cells from the UE. However, once reporting is activated, the UE proceeds with periodic reporting. As discussed above, the periodic reporting may take too much signaling resources and occupy too much UL channel resources, especially if the UE is monitoring many neighbor cells.

In aperiodic reporting, the network triggers the UE to report (i.e. a one time report based on when the network triggers the report). For example, the UE may only send aperiodic L1-RSRP or L1-SINR measurement reports when a DCI trigger is received from the network. After the UE receives a CSI request in the DCI, the UE transmits the aperiodic L1-RSRP or L1-SINR reporting on PUSCH over the air interface at the time specified. For L1/L2 mobility, the network may use an aperiodic request to ask the UE to report L1-RSRP/L1-RSRQ measurement results for both serving and neighbor cells. However, the network's request may not be at a correct time, which may delay triggering a timely TCI switching because the requested report might be very random and may not reflect the channel condition or beam condition change at the UE side.

Thus, because a TCI change may involve a cell change, embodiments disclosed herein provide event triggering reporting for L1/L2 mobility. Certain embodiments provide event configuration. In addition, or in another embodiment, an L1 filtering factor is provided. Further, event triggered L1 reporting is described.

Event Configuration

Figure 2:
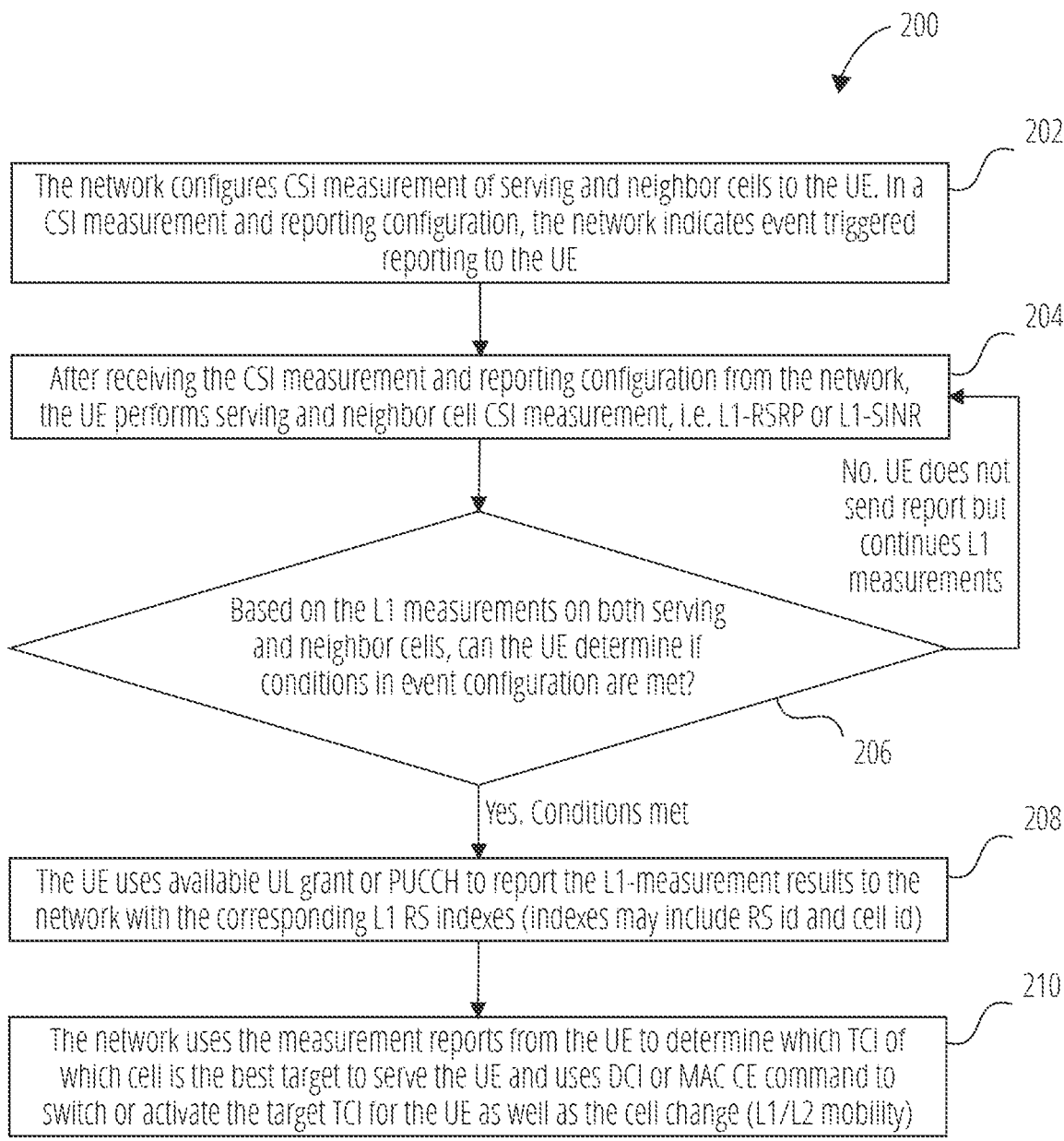
FIG. 2 is a flowchart illustrating an event configuration procedure according to certain embodiments.

Besides the existing periodical semi-persistent (SP), and aperiodic (AP) measurement reporting, in certain systems, a network and a UE can use event triggered L1 measurement reporting for L1-RSRP/L1-SINR. For example. FIG. 2 is a flowchart illustrating an event configuration procedure 200 according to certain embodiments. In a block 202 of the illustrated example event configuration procedure 200, the network configures CSI measurement of serving and neighbor cells to the UE. In a CSI measurement and reporting configuration, the network indicates event triggered reporting to the UE. The CSI measurement and reporting configuration includes one or more conditions for triggering an event to report the L1 measurements.

In a block 204, after receiving the CSI measurement and reporting configuration from the network, the UE performs serving and neighbor cell CSI measurement, i.e. L1-RSRP or L1-SINR.

In a block 206, the UE determines, based on the L1 measurements on both serving and neighbor cells, whether the one or more conditions in event configuration are met. If the one or more conditions are not met, the UE does not send a measurement report. Rather, the event configuration procedure 200 returns to the block 204 and the UE continues performing L1 measurements. If, however, the one or more conditions are met the event configuration procedure 200 proceeds to a block 208 where the UE uses available UL grant or PUCCH to report the L1-measurement results to the network with the corresponding L1 RS indexes (e.g., the indexes may include RS id and cell id).

In a block 210, the network uses the measurement reports from the UE to determine which TCI of which cell is the best target to serve the UE and uses DCI or MAC control element (CE) command to switch or activate the target TCI for the UE as well as the cell change (L1/L2 mobility).

In certain embodiments of the event configuration, there may be multiple types of events. For example, in a first event type (event type 1), the one or more conditions are met when the measurement results e.g. L1-RSRP or L1-SINR) of a target L1 reference signal (RS) or TCI or CSI are higher than a predefined threshold with a predefined offset. The predefined threshold may be per carrier/frequency-layer defined, or per cell defined, or per RS defined, or per TCI/CSI defined, or per L1 measurement configuration defined. The predefined offset may be per carrier/frequency-layer defined, or per cell defined, or per RS defined, or per TCI/CSI defined, or per L1 measurement configuration defined. The target L1 RS or TCI or CSI may be on the same serving cell as the current serving cell, in which case the TCI switching does not involve cell change. Otherwise, the TCI switching involves cell change.

In a second event type (event type 2), the one or more conditions are met when the measurement results (e.g. L1-RSRP or L1-SINR) of target L1 RS or TCI or CSI are higher than a first predefined threshold with a first predefined offset; and also the measurement results (e.g. L1-RSRP or L1-SINR) of current L1 RS or TCI or CSI are lower than a second predefined threshold with a second predefined offset. The above first/second predefined threshold or offset may have the similar types as in event type 1. The target and current L1 RS or TCI or CSI may be on the same serving cell, in which case the TCI switching does not involve cell change. Otherwise, the TCI switching involves cell change.

In a third event type (event type 3), the one or more conditions are met when the measurement results (e.g. L1-RSRP or L1-SINR) of target L1 RS or TCI or CSI are higher than a predefined threshold with a predefined offset over the measurement, results (e.g. L1-RSRP or L1-SINK) of current L1 RS or TCI or CSI. The above first/second predefined threshold or offset have the similar types as in event type 1. The target and current L1 RS or TCI or CSI may be on the same serving cell, in which case the TCI switching would not involve cell change. Otherwise, the TCI switching involves cell change.

Note that here L1/L2 mobility or cell change means the network use a TCI switch method to also change the cell for the UE, because in certain systems the UE monitors TCIs of both serving; and neighbor cells. The TCI switching may be triggered by using DCI (L1) or MAC CE activation/deactivation (L2).

L1 Filtering Factor

In L1 measurement and reporting, filtering may be used to reduce a "ping pong effect" where the UE frequently switches between serving cells, and/or to reduce the impact of noise and to improve measurement accuracy.

In one embodiment (filtering solution 1), the UE perform a L1 filtering for L1-RSRP/L1-RSRP/L1-RSRQ measurement reporting using the equation $Y_n=(1-a)*Y_{n-1}+a*X_n$. $Y_n$ is the filtered L1-RSRP or L1-SINR measurement results for L1 CST reporting. $Y_{n-1}$ is the last/old filtered L1-RSRP or L-SINR measurement results for L1 CSI reporting, where $Y_0=X_0$ for the first L1 filtering. The parameter "a" in the equation is a weight factor and may be configured per carrier/frequency-layer, or per cell, or per RS, or per TCI/CSI, or per L1 measurement configuration.

$X_n$ in the equation is the latest L1 measurement result of L1-RSRP or L1-SINR. In a first option (Option 1), if a parameter timeRestrictionForChannelMeasurement (this indication is from network to let UE perform L1 averaging or not, see TS38.214) is configured, $X_n$ is a one shot L1 RSRP or L1-SINR measurement, and otherwise $X_n$ is based on multiple shots of L1 RSRP or L1-SINR measurement (an average of multiple shots e.g., =3). In another option (Option 2). $X_n$ is always based on one shot L1 RSRP or L1-SINR measurement. In yet another option (Option 3), $X_n$ is always based on multiple shots of L1 RSRP or L1-SINK measurement (average of multiple shots e.g., =3).

In another embodiment (filtering solution 2), the network configures to the UE whether L1 filtering is used or not for L1 measurement reporting. If the network configures the UE to use L1 filtering, the L1 filtering in filtering solution 1 is used. Otherwise, if the network does not configure the UE to use L1 filtering, the UE uses the legacy L1 averaging rule for L1-RSRP or L1-SINR measurement and reporting. The legacy L1 averaging rule is to report the $X_n$ directly, and if timeRestrictionForChannelMeasurement (this indication is from network to let UE perform L1 averaging or not, see TS38.214) is configured, $X_n$ is one shot L1 RSRP or L1-SINR measurement, otherwise $X_n$ is based on multiple shots of L1 RSRP or L1-SINR measurement (average of multiple shots e.g., =3).

Event Triggered L1 Reporting

In certain embodiments, the event triggered L1 measurement (L1-RSRP or L1-SINR) reporting disclosed herein includes sub-types (note that this is an event triggered reporting type rather than the event type discussed above).

In one embodiment (event triggered reporting type 1), the UE is configured with event triggered periodic L1 measurement reporting wherein, when triggering or meeting the conditions set in the event, the UE starts periodic L1 measurement reporting to network. The first report in event triggered periodic L1 measurement reporting is the one in which the UE determines that the conditions set in the event are met.

In another embodiment (event triggered reporting type 2), the UE is configured with event triggered L1 measurement reporting wherein, when triggering or meeting the conditions set in the event, the UP sends one-time L1 measurement reporting to network for that event. In certain such embodiments, the UE does not send any event triggered L1 measurement reports as long as no reporting event condition is fulfilled.

In certain embodiments, the L1 measurement report may include, but is not limited to, the following information: L1-RSRP or L1-SINR measurement result with or without L1 filtering: the L1 RS (SSB or CSI-RS) index, the cell ID; and/or the L1 measurement configuration ID (e.g., the network may assign an index to the L1 measurement configuration).

Figure 3:
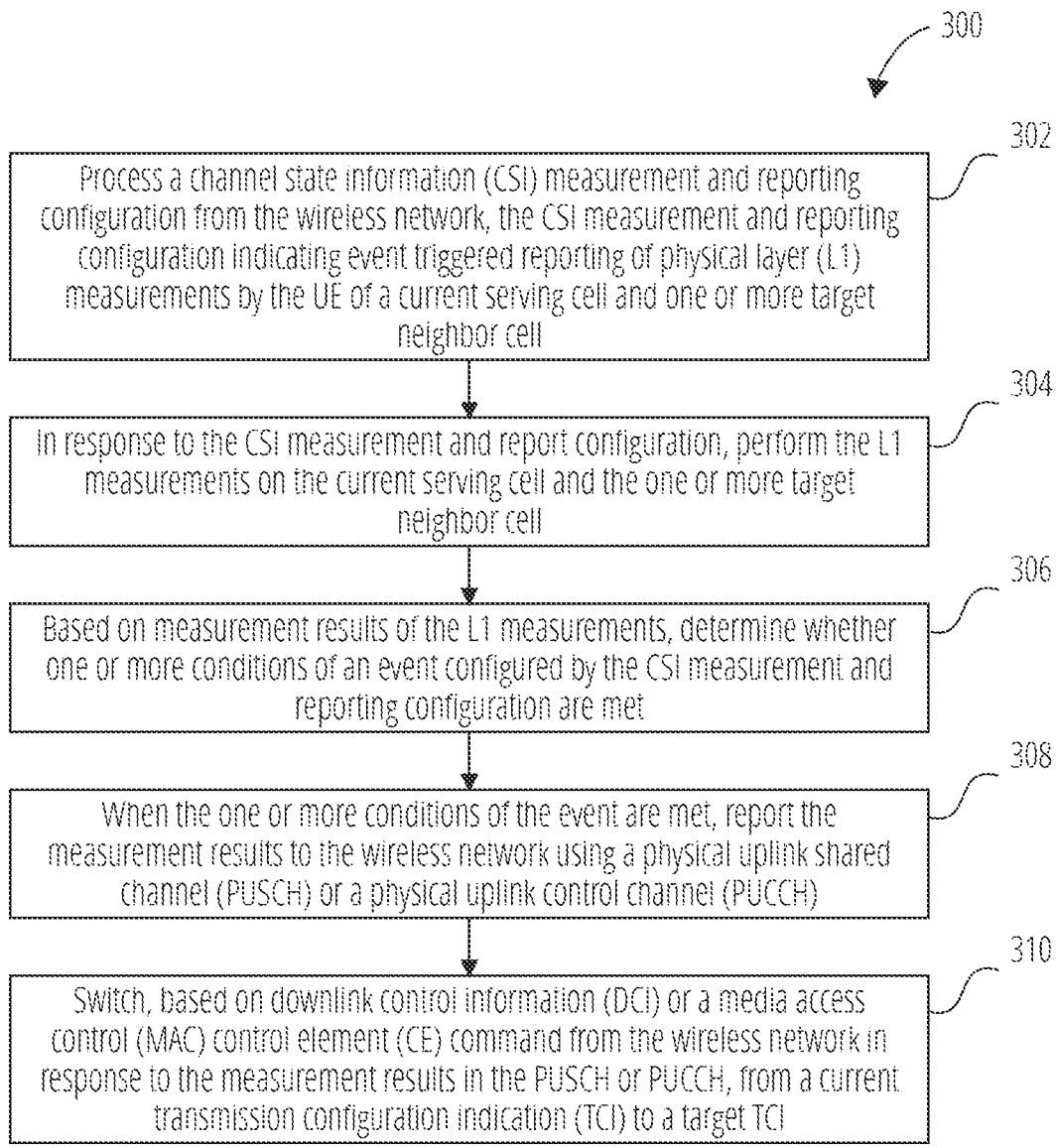
FIG. 3 is a flowchart of a method for a UE to communicate in a wireless network according to an example embodiment.

FIG. 3 is a flowchart of a method 300 for a user equipment (UE) to communicate in a wireless network according to an example embodiment. The method 300 may be performed, for example, by a UE or components of a UE (e.g., One or more baseband processors) described herein. In block 302, the method 300 includes processing a channel state information (CSI) measurement and reporting configuration from the wireless network. The CSI measurement and reporting configuration indicates event triggered reporting of physical layer (L1) measurements by the UE of a current serving cell and one or more target neighbor cell. In block 304, in response to the CSI measurement and reports configuration, the method 300 includes performing the L1 measurements on the current serving cell and the one or more target neighbor cell. In block 306, based on measurement results of the L1 measurements, the method 300 includes determining whether one or more conditions of an event configured by the CSI measurement and reporting configuration are met. In block 308, when the one or more conditions of the event are met, the method 300 includes reporting the measurement results to the wireless network using a physical uplink shared channel (PUSCH) or a physical uplink control channel (PUCCH). In block 310, the method 300 includes switching, based on downlink control information (DCI) or a media access control (MAC) control element (CE) command or a radio resource control (RRC) command from the wireless network in response to the measurement results in the PUSCH or PUCCH, from a current transmission configuration indication (TCI) to a target TCI.

In one embodiment, the method 300 further includes, based on switching from the current TCI to the target TCI, changing from the current serving cell to one of the one or more target neighbor cell as a new serving cell.

In one embodiment of the method 300, the CSI measurement and reporting configuration includes an event configuration comprises an event type. The event type may indicate that the one or more conditions are met when the measurement results of the L1 measurements of the one or more target neighbor cell are higher than a predefined threshold with a predefined offset. At least one of the predefined threshold and the predefined offset may be selected based on being per carrier or frequency-layer defined, per cell defined, per reference signal (RS) defined, per TCI or CSI defined, or per L1 measurement configuration defined.

In one embodiment of the method 300, the event type indicates that the one or more conditions are met when: the measurement results of the L1 measurements of the one or more target neighbor cell are higher than a first predefined threshold with a first predefined offset; and the measurement results of the L1 measurements of the current serving cell are lower than a second predefined threshold with a second predefined offset. In certain such embodiments, at least one of the first predefined threshold, the second predefined threshold, the first predefined offset, and the second predefined offset is selected based on being per carrier or frequency-layer defined, per cell defined, per reference signal (RS) defined, per TCI or CSI defined, or per L1 measurement configuration defined.

In one embodiment of the method 300, the event type indicates that the one or more conditions are met when the measurement results of the measurements of the one or more target neighbor cell are higher than a predefined threshold with a predefined offset over the measurement results of the L1 measurements of the current serving cell. In certain such embodiments, at least one of the predefined threshold and the predefined offset is selected based on being per carrier or frequency-layer defined, per cell defined, per reference signal (RS) defined, per TCI or CSI defined, or per L1 measurement configuration defined.

In certain embodiments of the method 300, the L1 measurements comprise an L1 reference signal received power (L1-RSRP) or an L1 signal-to-noise and interference ratio (L1-SINR) of a reference signal (RS) or the TCI or the CSI.

In one embodiment, the method 300 further includes: performing L1 filtering of the measurement results to obtain filtered L1 measurement results; and using the filtered L1 measurement results to determine whether the one or more conditions of the event are met. In certain such embodiments, L1 filtering comprises computing $Y_n=(1-a)*Y_{n-1}+a*X_n$ where: "$Y_n$" comprises the filtered L1 measurement results corresponding to filtered L1 reference signal received power (L1-RSRP) or L1 signal-to-noise and interference ratio (L1-SINR) measurement results for L1 CSI reporting; "$Y_{n-1}$" comprises last or previous filtered L1-RSRP or L1-SINR measurement results for L1 CSI reporting, wherein $Y_0=X_0$ for a first L1 filtering; "$X_n$" comprises latest L1-RSRP or L1-SINR measurement results; and "a" is a weight factor. "$X_n$" may be based on: a single L1 RSRP or L1-SINR measurement corresponding to the latest L1 measurement results; or a combination of a plurality of last or previous L1 RSRP or L1-SINR measurement results. The method 300 may further include processing an indication from the wireless network to determine whether the "$X_n$" is based on single L1 RSRP or L1-SINR measurement corresponding to the latest L1 measurement results or the combination of a plurality of last or previous L1 RSRP or L1-SINR measurement results, wherein the combination is an average.

In one embodiment, the method 300 further includes: processing an indication from the wireless network to determine whether or not to use the L1 filtering for L1 measurement reporting; if the indication is to use the L1 filtering for the L1 measurement reporting, continue to perform the L1 filtering by computing $Y_n=(1-a)*Y_{n-1}+a*X_n$; and if the indication is to not use the L1 filtering for the L1 measurement reporting, using an L1 averaging rule for L1-RSRP or L1-SINR measurement and reporting, wherein the L1 averaging rule is to report "$X_n$" directly.

In one embodiment of the method 300, the CSI measurement and reporting configuration includes an event configuration comprises an event triggered reporting type. The event triggered reporting type may comprise event triggered periodic L1 measurement reporting, and when triggering or meeting the one or more conditions of the event the UE sends a first report to the wireless network and starts periodic L1 measurement reporting to the wireless network. The event triggered reporting type may instead comprise event triggered L1 measurement reporting, and when triggering or meeting the one or more conditions of the event the UE sends a single L1 measurement reporting to the wireless network for the event and does not send an additional event triggered L1 measurement reporting until another reporting event condition is fulfilled.

In one embodiment of the method 300 using; the available PUSCH or PUCCH to report the measurement results to the wireless network, comprises generating an L1 measurement report including one or more parameter selected from a group comprising an L1 reference signal received power (L1-RSRP) or an L1 signal-to-noise and interference ratio (L1-SINR) measurement result with or without L1 filtering, an L1 reference signal (RS) index a cell identifier (ID) and an L1 measurement configuration ID.

Figure 4:
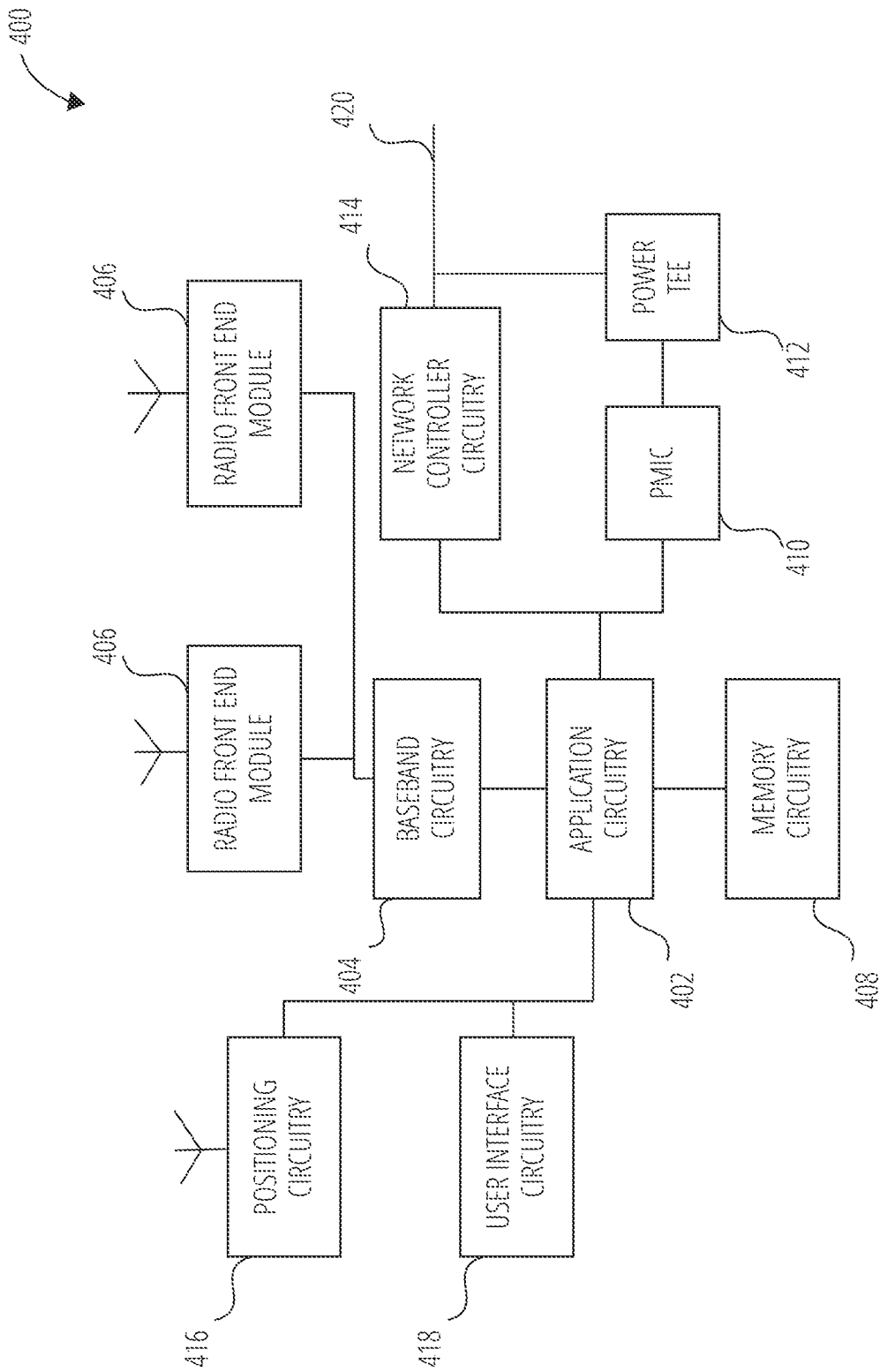
FIG. 4 illustrates an infrastructure equipment in accordance with one embodiment.

FIG. 4 illustrates an example of infrastructure equipment 400 in accordance with various embodiments. The infrastructure equipment 400 may be implemented as a base station, radio head, RAN node, AN, application server, and/or any other element/device discussed herein. In other examples the infrastructure equipment 400 could be implemented in or by a UE.

The infrastructure equipment 400 includes application circuitry 402, baseband circuitry 404, one or more radio front end module 406 (RFEM) memory circuitry 408, power management integrated circuitry (shown as PMIC 410), power tee circuitry 412, network controller circuitry 414, network interface connector 420, satellite positioning circuitry 416, and user interface circuitry 418. In some embodiments, the device infrastructure equipment 400 may include additional elements such as, for example, memory storage, display, camera, sensor, or input/output (I/O) interface. In other embodiments, the components described below may be included in more than one device. For example, said circuitries may be separately included in more than one device for CRAM, vBBU, or other like implementations. Application circuitry 402 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor interface (MIPI) interfaces and Joint Test Access Group (JTAG) test access ports. The processors (or cores) of the application circuitry 402 may be coupled with or may include memory/storage elements and may be configured to execute instructions stored in the memory/storage to enable various applications or operating systems to run on the infrastructure equipment 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 402 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 402 may comprise, or may be, a special-purpose processor/controller to operate according to the various embodiments herein. As examples, the processor(s) of application circuitry 402 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 400 may not utilize application circuitry 402, and instead may include a special-purpose processor/controller to process IP data received from an EPC or 5GC, for example.

In some implementations, the application circuitry 402 may include one or more hardware accelerators, which may be microprocessors, programmable processing devices or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SOCs (PSoCs); and the like. In such implementations, the circuitry of application circuitry 402 may comprise logic blocks or logic fabric, and other interconnected resources that may be programmed to perform various functions, such as the procedures, methods, functions, etc. of the various embodiments discussed herein. In such embodiments, the circuitry of application circuitry 402 may include memory cells (e.g., erasable programmable read-only memory (EPROM), electrically erasable programmable read-only memory (EEPROM), flash memory, static memory (e.g., static random access memory(SRAM), antifuses, etc.)) used to store logic blocks, logic fabric, data, etc. in look-up-tables (LUTs) and the like. The baseband circuitry 404 may be implemented, for example, as a solder-down substrate including one or more integrated circuits, a single packaged integrated circuit soldered to a main circuit board or a multi-chip module containing two or more integrated circuits.

The user interface circuitry 418 may include one or more user interfaces designed to enable user interaction with the infrastructure equipment 400 or peripheral component interfaces designed to enable peripheral component interaction with the infrastructure equipment 400. User interfaces may include, but are not limited to, one or more physical or virtual buttons (e.g., a reset button), one or more indicators (e.g., light emitting diodes (LEDs)), a physical keyboard or keypad, a mouse, a touchpad a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 406, which incorporates both mmWave antennas and sub-mmWave.

The memory circuitry 408 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 408 may be implemented as one or more of solder down packaged integrated circuits, socketed memory modules and plug-in memory cards.

The PMIC 410 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 412 may provide for electrical power drawn from a network cable to provide both power supply and data connectivity to the infrastructure equipment 400 using a single cable.

The network controller circuitry 414 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 420 using a physical connection, which may be electrical (commonly referred to as a "copper interconnect"), optical, or wireless. The network controller circuitry 414 may include one or more dedicated processors and/or FPGAs to communicate using one or more of the aforementioned protocols. In some implementations, the network controller circuitry 414 may include multiple controllers to provide connectivity to other networks using the same or different protocols.

The positioning circuitry 416 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS),etc.), or the like. The positioning circuitry 416 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 416 may include a Micro-Technology for Positioning, Navigation, and Timing (Micro-PNT) IC that uses a master timing clock to perform position tracking/estimation without GNSS assistance. The positioning circuitry 416 may also be part of, or interact with, the baseband circuitry 404 and/or radio front end module 406 to communicate with the nodes and components of the positioning network. The positioning circuitry 416 may also provide position data and/or time data to the application circuitry 402, which may use the data to synchronize operations with various infrastructure, or the like. The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 5:
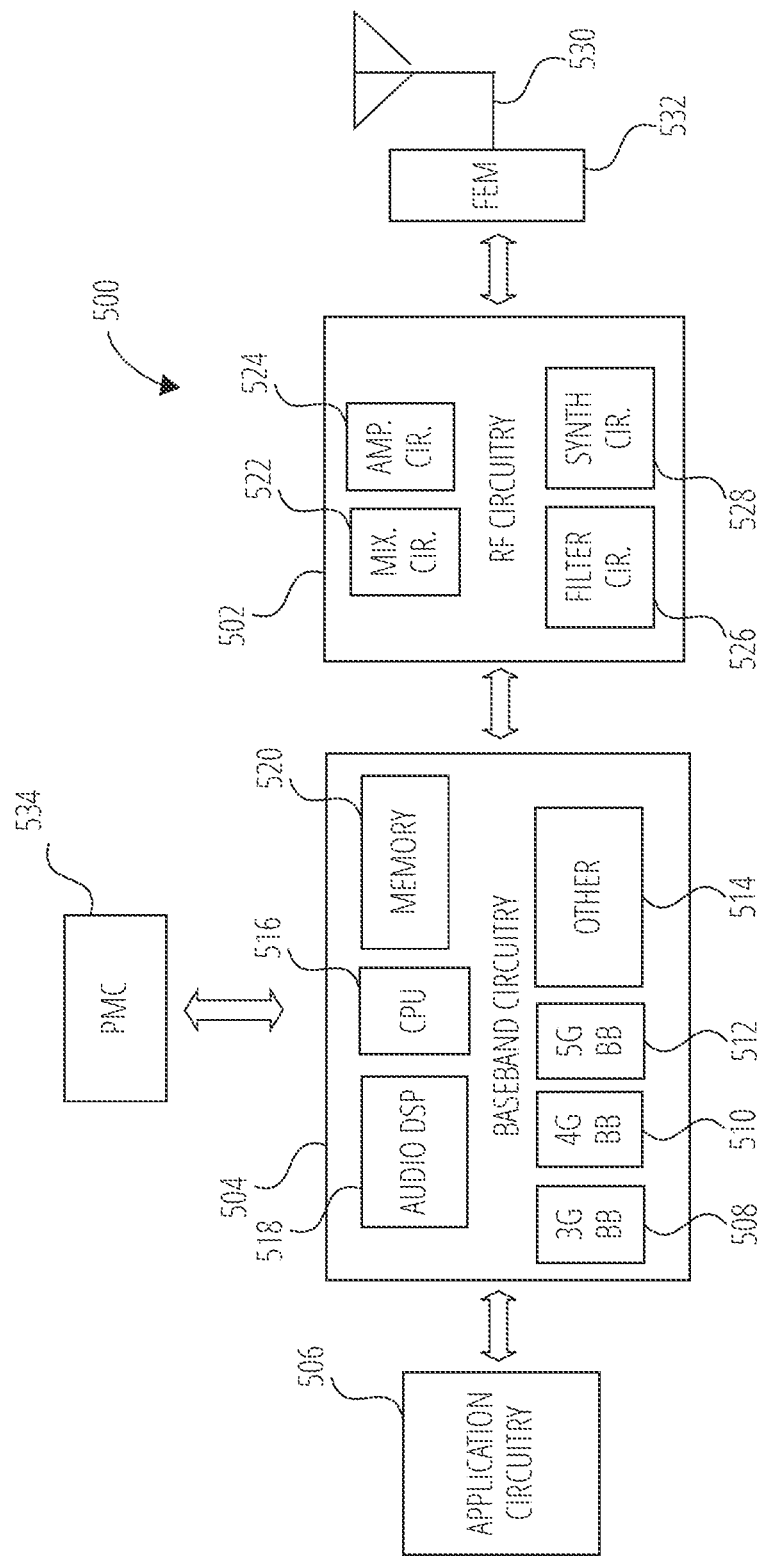
FIG. 5 illustrates a device in accordance with one embodiment.

FIG. 5 illustrates example components of a device 500 in accordance with some embodiments. In some embodiments, the device 500 may include application circuitry 506, baseband circuitry 504, Radio Frequency (RE) circuitry (shown as RE circuitry 502) front-end module (TEM) circuitry (shown as FEM circuitry 532), one or more antennas 530, and power management circuitry (PMC) (shown as PMC 534) coupled together at least as shown. The components of the illustrated device 500 may be included in a UE or a RAN node. In some embodiments, the device 500 may include fewer elements (e.g., a RAN node may not utilize application circuitry 506, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 506 may include one or more application processors. For example, the application circuitry 506 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 506 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 502 and to generate baseband signals for a transmit signal path of the RF circuitry 502. The baseband circuitry 504 may interface with the application circuitry 506 for generation and processing of the baseband signals and for controlling operations of the RF circuitry 502. For example, in some embodiments, the baseband circuitry 504 may include a third generation (3G) baseband processor (3G baseband processor 508), a fourth generation (4G) baseband processor (4G baseband processor 510), a fifth generation (5G) baseband processor (5G baseband processor 512), or other baseband processor(s) 514 for other existing generations, generations in development or to be developed in the future (e.g., second generation (2G), sixth generation (6G), etc.). The baseband circuitry 504 (e.g., one or more of baseband processors) may handle various radio control functions that enable communication with one or more radio networks via the RF circuitry 502. In other embodiments, some or all of the functionality of the illustrated baseband processors may be included in modules stored in the memory 520 and executed via a Central Processing Unit (CPU 516). The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include a digital signal processor (DSP), such as one or more audio DSP(s) 518. The one or more audio DSP(s) 518 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 506 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), wireless local area network (WLAN), or a wireless personal area network (WPAN). Embodiments in which the baseband circuitry 504 is configured to support radio communications of more than one wireless protocol may be referred to as multi-mode baseband circuitry.

The RF circuitry 502 may enable communication with wireless networks using modulated electromagnetic radiation through a non-solid medium. In various embodiments, the RF circuitry 502 may include switches, filters, amplifiers, etc. to facilitate the communication with the wireless network. The RF circuitry 502 may include a receive signal path which may include circuitry to down-convert RF signals received from the FEM circuitry 532 and provide baseband signals to the baseband circuitry 504. The RF circuitry 502 may also include a transmit signal path which may include circuitry to up-convert baseband signals provided by the baseband circuitry 504 and provide RF output signals to the FEM circuitry 532 for transmission.

In some embodiments, the receive signal path of the RF circuitry 502 may include mixer circuitry 522, amplifier circuitry 524 and filter circuitry 526. In some embodiments, the transmit signal path of the RF circuitry 502 may include filter circuitry 526 and mixer circuitry 522. The RF circuitry 502 may also include synthesizer circuitry 528 for synthesizing a frequency for use by the mixer circuitry 522 of the receive signal path and the transmit signal path, in some embodiments, the mixer circuitry 522 of the receive signal path may be configured to down-convert RF signals received from the FEM circuitry 532 based on the synthesized frequency provided by synthesizer circuitry 528. The amplifier circuitry 524 may be configured to amplify the down-converted signals and the filter circuitry 526 may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 522 of the receive signal path may comprise passive mixers, although the scope of the embodiments is not limited in this respect.

In some embodiments, the mixer circuitry 522 of the transmit signal path may be configured to up-convert input baseband signals based on the synthesized frequency provided by the synthesizer circuitry 528 to generate RF output signals for the FEM circuitry 532. The baseband signals may be provided by the baseband circuitry 504 and may be filtered by the filter circuitry 526.

In some embodiments, the mixer circuitry 522 of the receive signal path and the mixer circuitry 522 of the transmit signal path may include two or more mixers and may be arranged for quadrature downconversion and upconversion respectively. In some embodiments, the mixer circuitry 522 of the receive signal path and the mixer circuitry 522 of the transmit signal path may include two or more mixers and may be arranged for image rejection (e.g., Hartley image rejection). In some embodiments, the mixer circuitry 522 of the receive signal path and the mixer circuitry 522 may be arranged fir direct downconversion and direct upconversion, respectively. In some embodiments, the mixer circuitry 522 of the receive signal path and the mixer circuitry 522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 502 may include analog-to-digital converter (ADC) and digital-to-analog converter (DAC) circuitry and the baseband circuitry 504 may include a digital baseband interface to communicate with the RF circuitry 502.

In some dual-mode embodiments, a separate radio IC circuitry may be provided for processing signals for each spectrum, although the scope of the embodiments is not limited in this respect.

In some embodiments, the synthesizer circuitry 528 may be a fractional-N synthesizer or a fractional N/N+1 synthesizer, although the scope of the embodiments is not limited in this respect as other types of frequency synthesizers may be suitable. For example, synthesizer circuitry 528 may be a delta-sigma synthesizer, a frequency multiplier, or a synthesizer comprising a phase-locked loop with a frequency divider.

The synthesizer circuitry 528 may be configured to synthesize an output frequency for use by the mixer circuitry 522 of the RF circuitry 502 based on a frequency input and a divider control input. In some embodiments, the synthesizer circuitry 528 may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 506 (such as an applications processor) depending on the desired output frequency. In some embodiments, a divider control input (e.g., N) may be determined from a look-up table based on a channel indicated by the application circuitry 506.

Synthesizer circuitry 528 of the RF circuitry 502 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements a phase detector a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 528 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments the RF circuitry 502 may include an IQ/polar converter.

The FEM circuitry 532 may include a receive signal path which may include circuitry configured to operate on RF signals received from one or more antennas 530, amplify the received signals and provide the amplified versions of the received signals to the RE circuitry 502 for further processing. The FEM circuitry 532 may also include a transmit signal path which may include circuitry configured to amplify signals for transmission provided by the RF circuitry 502 for transmission by one or more of the one or more antennas 530. In various embodiments, the amplification through the transmit or receive signal paths may be done solely in the RF circuitry 502, solely in the EEM circuitry 532, or in both the RE circuitry 502 and the FEM circuitry 532.

In some embodiments, the FEM circuitry 532 may include a TX/RX switch to switch between transmit mode and receive mode operation. The FEM circuitry 532 may include a receive signal path and a transmit signal path. The receive signal path of the FEM circuitry 532 may include an LNA to amplify received RF signals and provide the amplified received RF signals as an output (e.g., to the RF circuitry 502). The transmit signal path of the FEM circuitry 532 may include a power amplifier (PA) to amplify input RF signals (e.g., provided by the RF circuitry 502), and one or more filters to generate RF signals for subsequent transmission (e.g., by one or more of the one or more antennas 530).

In some embodiments the PMC 534 may manage power provided to the baseband circuitry 504. In particular, the PMC 534 may control power-source selection, voltage scaling, battery charging, or DC-to-DC conversion. The PMC 534 may often be included when the device 500 is capable of being powered by a battery, for example when the device 500 is included in a UE. The PMC 534 may increase the power conversion efficiency while providing desirable implementation size and heat dissipation characteristics.

FIG. 5 shows the PMC 534 coupled only with the baseband circuitry 504. However, in other embodiments, the PMC 534 may be additionally or alternatively coupled with, and perform similar power management operations for, other components such as, but not limited to, the application circuitry 506, the RF circuitry 502, or the FEM circuitry 532.

In some embodiments, the PMC 534 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 506 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 506 may utilize data (e.g. packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
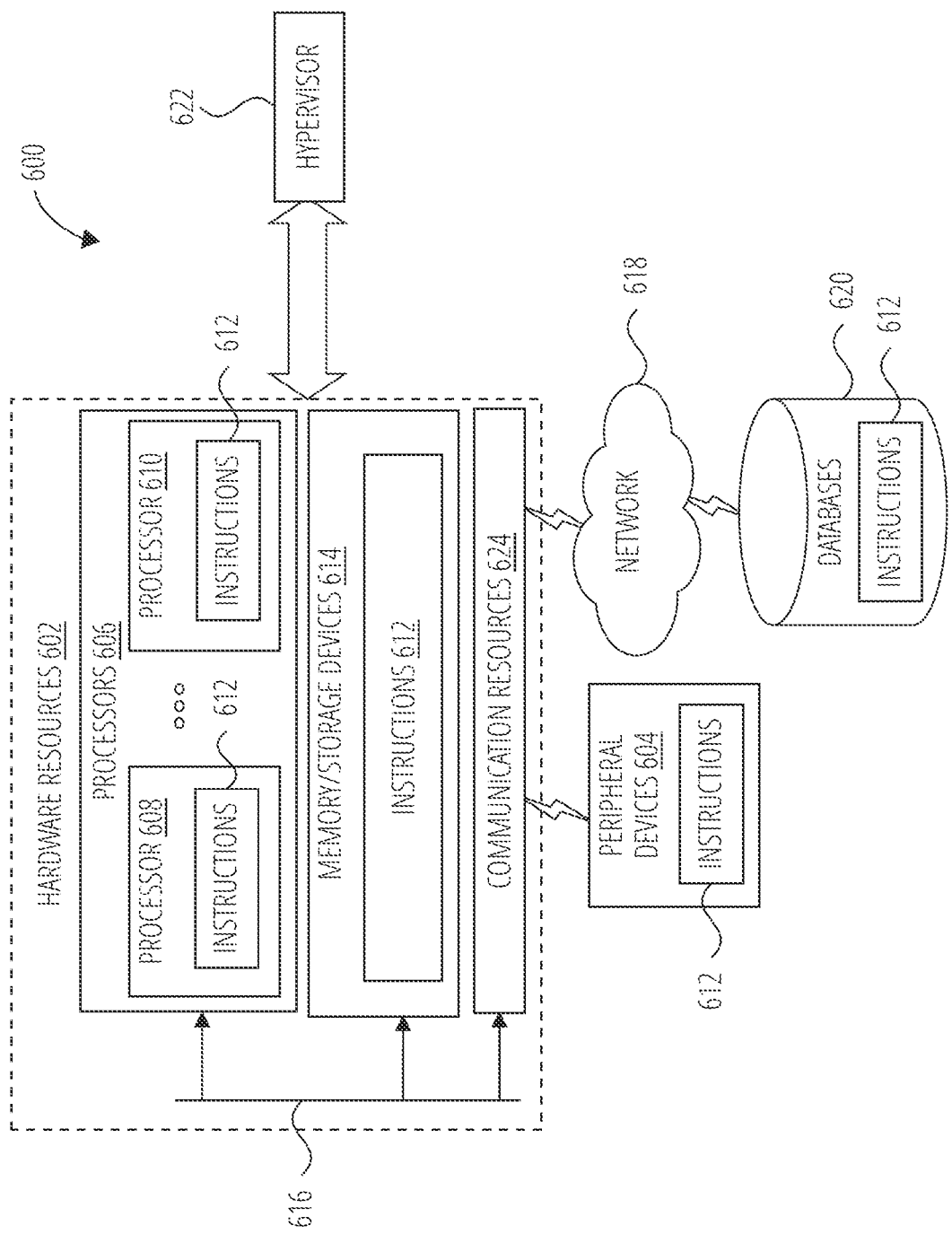
FIG. 6 illustrates components in accordance with one embodiment.

FIG. 6 is a block diagram illustrating components 600, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 602 including one or more processors 606 (or processor cores), one or more memory/storage devices 614, and one or more communication resources 624, each of which may be communicatively coupled via a bus 616. For embodiments where node virtualization (e.g., NFV) is utilized, a hypervisor 622 may be executed to provide an execution environment for one or more network slices/sub-slices to utilize the hardware resources 602.

The processors 606 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 608 and a processor 610.

The memory/storage devices 614 may include main memory, disk storage, or any suitable combination thereof. The memory/storage devices 614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 624 may include interconnection or network interface components or other suitable devices to communicate with one or more peripheral devices 604 or one or more databases 620 via a network 618. For example, the communication resources 624 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 612 may comprise software, a program, an application, an applet, an app, or other executable code for causing at least any of the processors 606 to perform any one or more of the methodologies discussed herein. The instructions 612 may reside, completely or partially, within at least one of the processors 606 (e.g., within the processor's cache memory), the memory/storage devices 614, or any suitable combination thereof. Furthermore, any portion of the instructions 612 may be transferred to the hardware resources 602 from any combination of the peripheral devices 604 or the databases 620. Accordingly, the memory of the processors 606, the memory/storage devices 614, the peripheral devices 604, and the databases 620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 may include an apparatus comprising means to perform one or more elements of a method described in or related to any of the above embodiments, or any other method or process described herein.

Example 2 may include one or more non-transitory computer-readable media comprising instructions to cause an electronic device, upon execution of the instructions by one or more processors of the electronic device, to perform one or more elements of a method described in or related to any of the above embodiments, or any other method or process described herein.

Example 3 may include an apparatus comprising, logic, modules, or circuitry to perform one or more elements of a method described in or related to any of the above embodiments, or any other method or process described herein.

Example 4 may include a method, technique, or process as described in or related to any of the above embodiments, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above embodiments, or portions thereof.

Example 6 may include a signal as described in or related to any of the above embodiments, or portions or parts thereof.

Example 7 may include a datagram, packet, frame, segment, protocol data unit (PDU), or message as described in or related to any of the above embodiments, or portions or parts thereof, or otherwise described in the present disclosure.

Example 8 may include a signal encoded with data as described in or related to any of the above embodiments, or portions or parts thereof, or otherwise described in the present disclosure.

Example 9 may include a signal encoded with a datagram, packet, frame, segment, PDU, or message as described in or related to any of the above embodiments, or portions or parts thereof, or otherwise described in the present disclosure.

Example 10 may include an electromagnetic signal carrying computer-readable instructions wherein execution of the computer-readable instructions by one or more processors is to cause the one or more processors to perform the method, techniques, or process as described in or related to any of the above embodiments, or portions thereof.

Example 11 may include a computer program comprising instructions, wherein execution of the program by a processing element is to cause the processing element to carry out the method, techniques, or process as described in or related to any of the above embodiments, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or w limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable in; to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to communicate in a wireless network, the method comprising:
   processing a channel state information (CSI) measurement and reporting configuration from the wireless network, the CSI measurement and reporting configuration indicating event triggered reporting of physical layer (L1) measurements by the UE of a current serving cell and one or more target neighbor cell;
   in response to the CSI measurement and reporting configuration, performing the L1 measurements on the current serving cell and the one or more target neighbor cell;
   based on measurement results of the L1 measurements, determining whether one or more conditions of an event configured by the CSI measurement and reporting configuration are met;
   when the one or more conditions of the event are met, reporting the measurement results to the wireless network using a physical uplink shared channel (PUSCH) or a physical uplink control channel (PUCCH);
   switching, based on downlink control information (DCI) or a media access control (MAC) control element (CE) command or a radio resource control (RRC) command from the wireless network in response to the measurement results in the PUSCH or the PUCCH, from a current transmission configuration indication (TCI) to a target TCI;
   performing L1 filtering of the measurement results to obtain filtered L1 measurement results; and
   using the filtered L1 measurement results to determine whether the one or more conditions of the event are met.

2. The method of claim 1, further comprising, based on switching from the current TCI to the target TCI, changing from the current serving cell to one of the one or more target neighbor cell as a new serving cell.

3. The method of claim 1, wherein the CSI measurement and reporting configuration includes an event configuration comprises an event type.

4. The method of claim 3, wherein the event type indicates that the one or more conditions are met when the measurement results of the L1 measurements of the one or more target neighbor cell are higher than a predefined threshold with a predefined offset.

5. The method of claim 4, wherein at least one of the predefined threshold and the predefined offset is selected based on being per carrier or frequency-layer defined, per cell defined, per reference signal (RS) defined, per TCI or CSI defined, or per L1 measurement configuration defined.

6. The method of claim 3, wherein the event type indicates that the one or more conditions are met when:
   the measurement results of the L1 measurements of the one or more target neighbor cell are higher than a first predefined threshold with a first predefined offset; and
   the measurement results of the L1 measurements of the current serving cell are lower than a second predefined threshold with a second predefined offset.

7. The method of claim 6, wherein at least one of the first predefined threshold, the second predefined threshold, the first predefined offset, and the second predefined offset is selected based on being per carrier or frequency-layer defined, per cell defined, per reference signal (RS) defined, per TCI or CSI defined, or per L1 measurement configuration defined.

8. The method of claim 3, wherein the event type indicates that the one or more conditions are met when the measurement results of the L1 measurements of the one or more target neighbor cell are higher than a predefined threshold with a predefined offset over the measurement results of the L1 measurements of the current serving cell.

9. The method of claim 8, wherein at least one of the predefined threshold and the predefined offset is selected based on being per carrier or frequency-layer defined, per cell defined, per reference signal (RS) defined, per TCI or CSI defined, or per L1 measurement configuration defined.

10. The method of claim 1, wherein the L1 measurements comprise an L1 reference signal received power (L1-RSRP) or an L1 signal-to-noise and interference ratio (L1-SINR) of a reference signal (RS) or the TCI or the CSI.

11. The method of claim 1, wherein L1 filtering comprises computing $Y_n=(1-a)*Y_{n-1}+a*X_n$ where:
 "$Y_n$" comprises the filtered L1 measurement results corresponding to filtered L1 reference signal received power (L1-RSRP) or L1 signal-to-noise and interference ratio (L1-SINR) measurement results for L1 CSI reporting;
 "$Y_{n-1}$" comprises last or previous filtered L1-RSRP or L1-SINR measurement results for L1 CSI reporting, wherein $Y_0=X_0$ for a first L1 filtering;
 "$X_n$" comprises latest L1-RSRP or L1-SINR measurement results; and
 "a" is a weight factor.

12. The method of claim 11, wherein "$X_n$" is based on:
 a single L1 RSRP or L1-SINR measurement corresponding to the latest L1 measurement results; or
 a combination of a plurality of last or previous L1 RSRP or L1-SINR measurement results.

13. The method of claim 12, further comprising processing an indication from the wireless network to determine whether the "$X_n$" is based on single L1 RSRP or L1-SINR measurement corresponding to the latest L1 measurement results or the combination of a plurality of last or previous L1 RSRP or L1-SINR measurement results, wherein the combination is an average.

14. The method of claim 11, further comprising:
 processing an indication from the wireless network to determine whether or not to use the L1 filtering for L1 measurement reporting;
 if the indication is to use the L1 filtering for the L1 measurement reporting, continue to perform the L1 filtering by computing $Y_n=(1-a)*Y_{n-1}+a*X_n$; and
 if the indication is to not use the L1 filtering for the L1 measurement reporting, using an L1 averaging rule for L1-RSRP or L1-SINR measurement and reporting, wherein the L1 averaging rule is to report "$X_n$" directly.

15. The method of claim 1, wherein the CSI measurement and reporting configuration includes an event configuration comprises an event triggered reporting type.

16. The method of claim 15, wherein the event triggered reporting type comprises event triggered periodic L1 measurement reporting, and wherein when triggering or meeting the one or more conditions of the event the UE sends a first report to the wireless network and starts periodic L1 measurement reporting to the wireless network.

17. The method of claim 15, wherein the event triggered reporting type comprises event triggered L1 measurement reporting, and wherein when triggering or meeting the one or more conditions of the event the UE sends a single L1 measurement reporting to the wireless network for the event and does not send an additional event triggered L1 measurement reporting until another reporting event condition is fulfilled.

18. The method of claim 1, wherein using an available PUSCH or PUCCH to report the measurement results to the wireless network comprises generating an L1 measurement report including one or more parameter selected from a group comprising an L1 reference signal received power (L1-RSRP) or an L1 signal-to-noise and interference ratio (L1-SINR) measurement result with or without L1 filtering, an L1 reference signal (RS) index, a cell identifier (ID), and an L1 measurement configuration ID.

* * * * *